(12) United States Patent
Kito et al.

(10) Patent No.: US 9,931,928 B2
(45) Date of Patent: Apr. 3, 2018

(54) FILLER PIPE AND VEHICLE FUEL FILLER PORT STRUCTURE

(71) Applicants: TOYOTA JIDOSHA KABUSHIKI KAISHA, Toyota-shi, Aichi-ken (JP); TOYODA GOSEI CO., LTD., Kiyosu-shi, Aichi-ken (JP)

(72) Inventors: Motoyasu Kito, Aichi-gun (JP); Akihito Hirunagi, Toyota (JP); Shinji Shimokawa, Seto (JP); Atsushi Sekihara, Kiyosu (JP); Yoshinari Hiramatsu, Kiyosu (JP)

(73) Assignees: TOYOTA JIDOSHA KABUSHIKI KAISHA, Toyota (JP); TOYODA GOSEI CO., LTD., Kiyosu-shi (JP)

( * ) Notice: Subject to any disclaimer, the term of this patent is extended or adjusted under 35 U.S.C. 154(b) by 0 days.

(21) Appl. No.: 15/430,991

(22) Filed: Feb. 13, 2017

(65) Prior Publication Data
US 2017/0232837 A1    Aug. 17, 2017

(30) Foreign Application Priority Data
Feb. 16, 2016    (JP) .................................. 2016-026766

(51) Int. Cl.
*B65B 31/00*    (2006.01)
*B60K 15/04*    (2006.01)

(52) U.S. Cl.
CPC ...... *B60K 15/04* (2013.01); *B60K 2015/0458* (2013.01)

(58) Field of Classification Search
CPC ...................... B60K 15/04; B60K 2015/0458
See application file for complete search history.

(56) References Cited

U.S. PATENT DOCUMENTS

2015/0151633 A1*    6/2015    Kito .................. B60K 15/04
                                                            137/527

FOREIGN PATENT DOCUMENTS

JP    2014-104919 A    6/2014

* cited by examiner

*Primary Examiner* — Jason K Niesz
(74) *Attorney, Agent, or Firm* — Oliff PLC

(57) ABSTRACT

A filler pipe is attached to a retainer that holds a fuel nozzle holder. The retainer includes: a first attaching portion attached to an inlet portion of the filler pipe; a holding portion having an engaging hole; and an opening positioned at a first end of the retainer, which is closer to a longitudinal center of the filler pipe than a second end is. The fuel nozzle holder includes: a second attaching portion and including an engaging piece that engages the engaging hole; and a main body extending from the second attaching portion toward the longitudinal center of the filler pipe. The engaging piece is surrounded at three sides by a groove having a U-shape. The engaging piece is connected to the second attaching portion on the main body-side. The holding portion extends toward the longitudinal center of the filler pipe to cover the groove.

12 Claims, 6 Drawing Sheets

RELATED ART

RELATED ART

FILLER PIPE AND VEHICLE FUEL FILLER PORT STRUCTURE

INCORPORATION BY REFERENCE

The disclosure of Japanese Patent Application No. 2016-026766 filed on Feb. 16, 2016, including the specification, drawings and abstract is incorporated herein by reference in its entirety.

BACKGROUND

1. Technical Field

The present disclosure relates to a filler pipe, and relates also to a vehicle fuel filler port structure.

2. Description of Related Art

A filler pipe 110 is disposed to supply fuel into a fuel tank of a vehicle from a vehicle body fuel filler port provided in a vehicle body, as illustrated in FIG. 9. A distal end portion 141 of a fuel nozzle 140 is inserted into a filler port 111, and the fuel is supplied into the filler pipe 110.

For example, Japanese Patent Application Publication No. 2014-104919 (JP 2014-104919 A) describes a technology in which a retainer 120 is provided inside an inlet portion 112 of the filler pipe 110 and a distal end portion of the retainer 120 extends in a long pipeshape, in order to hold the fuel nozzle 140 and stabilize the flow of fuel. In this case, the distal end portion 141 of the fuel nozzle 140 is held by the distal end portion of the retainer 120 such that the distal end portion 141 of the fuel nozzle 140 is always pointing in the same direction.

However, in this case, the retainer 120 is formed of a separate member, and the distal end portion of the retainer 120 extends in a long pipe shape. As a result, the overall weight of the retainer 120 increases, which runs contrary to the demand for a reduction in the weight of the vehicle body. Further, in order to hold the distal end portion 141 of the fuel nozzle 140, the pipe diameter of the distal end portion of the retainer 120 needs to be substantially the same as the nozzle diameter of the distal end portion 141 of the fuel nozzle 140. Consequently, it takes a lot of time and effort to insert the distal end portion 141 of the fuel nozzle 140 into the retainer 120 and to remove the distal end portion 141 of the fuel nozzle 140 from the retainer 120.

When the distal end portion of the retainer 120 is not so long, the distal end portion 141 of the fuel nozzle 140 can be inserted into the filler pipe 110 until it comes into contact with the filler pipe 110. As a result, the position of the distal end portion 141 of the fuel nozzle 140 varies largely in the filler pipe 110, so that the flow of fuel is hindered, or the fuel flows backward and an auto-stop sensor of the fuel nozzle 140 is activated in the course of fueling. Consequently, the fueling performance is reduced.

Further, when the fuel nozzle 140 is inserted deep into the filler pipe 110, the fuel nozzle 140 may become stuck between the filler pipe 110 and the retainer 120 and it may be difficult to pull out the fuel nozzle 140. Furthermore, when the fuel nozzle 140 is inserted deep into the filler pipe 110, there may be interference between a main body of the fuel nozzle 140 and the vehicle body.

Therefore, for example, JP 2014-104919 A describes a technology in which a retainer 220 and a fuel nozzle holder 230 that holds the distal end portion 141 of the fuel nozzle 140 are attached to an inlet portion 212 of a filler pipe 210, as illustrated in FIG. 10. The fuel nozzle holder 230 is provided with an engaging tab 231. The inlet portion 212 of the filler pipe 210 is provided with an engaging tab 213. The engaging tab 231 is engaged with the engaging tab 213.

There is also a technology in which a retainer 320 is attached to an inlet portion 312 of a filler pipe 310, and a fuel nozzle holder 330 is attached to the retainer 320, as illustrated in FIG. 11 and FIG. 12. In this case, a main body 331 of the fuel nozzle holder 330 is engaged with a distal end of the retainer 320, and an attaching portion 332 is in contact with an inner surface of the retainer 320, thereby providing sealing.

However, at a portion where an engaging tab is to be provided on the attaching portion 332 of the fuel nozzle holder 330, a groove 332a is provided as illustrated in FIG. 12. Thus, the fuel or the gas containing fuel vapor flowing back from the filler pipe 310 or a breather pipe (not illustrated) during fueling passes through a gap between the fuel nozzle holder 330 and the retainer 320, and then leaks out from an inlet of the filler pipe 310, as indicated by an arrow in FIG. 12.

SUMMARY

The present disclosure provides a filler pipe and a vehicle fuel filler port structure that are configured to prevent fuel and gas containing fuel vapor from leaking out during fueling.

The first aspect of the present disclosure provides a filler pipe to which a retainer that holds a fuel nozzle holder is attached. In the first aspect, the retainer includes: a first attaching portion attached to an inlet portion of the filler pipe; a holding portion having an engaging hole; and an opening positioned at a first end of the retainer, the first end being closer to a longitudinal center of the filler pipe than a second end of the retainer is, and the fuel nozzle holder includes: a second attaching portion having a circular cylindrical shape, the second attaching portion including an engaging piece; and a main body extending from the second attaching portion toward the longitudinal center of the filler pipe. The engaging piece is surrounded at three sides by a groove having a U-shape, the engaging piece being connected to the second attaching portion by a connecting portion provided on a main body-side of the engaging piece, and the holding portion extends toward the longitudinal center of the filler pipe such that the groove is covered with the holding portion, and the fuel nozzle holder is held by the retainer by engaging the engaging piece with the engaging hole.

In the filler pipe that supplies fuel into a fuel tank from a vehicle body fuel filler port provided in a vehicle body outer surface, the retainer and the fuel nozzle holder are attached to the inlet portion of the filler pipe. With this configuration, when a fuel nozzle is inserted into the inlet portion of the filler pipe, the retainer and the fuel nozzle holder can guide a distal end portion of the fuel nozzle and hold the distal end portion of the fuel nozzle in a prescribed position in the filler pipe. As a result, fuel can be reliably supplied.

The retainer includes the first attaching portion attached to the inlet portion of the filler pipe, the holding portion that holds the fuel nozzle holder, and the opening positioned at the first end of the retainer. With this configuration, when the first attaching portion is attached to the inlet portion of the filler pipe, the retainer is held at the first attaching portion in the filler pipe. The holding portion holds the fuel nozzle holder., and the distal end portion of the fuel nozzle is held in a prescribed position by the fuel nozzle holder. Thus, the direction in which fuel is squirted can be maintained constant. Because the engaging hole is provided in the holding portion, the fuel nozzle holder can be engaged in a prescribed position in the retainer by engaging the engaging piece with the engaging hole.

The fuel nozzle holder includes the second attaching portion, the main body. The second attaching portion is attached to the retainer. The main body extends from the second attaching portion. Thus, the second attaching portion comes into contact with an inner surface of the retainer, whereby the fuel nozzle holder is held inside the retainer. When the fuel nozzle is inserted into the retainer and the fuel nozzle holder from an inlet of the filler pipe, the distal end portion of the fuel nozzle is held by the fuel nozzle holder, so that the fuel nozzle can be stably held.

The second attaching portion has a circular cylindrical shape, and includes an engaging piece protruding radially outward. Thus, the fuel nozzle holder can be engaged in a prescribed position in the retainer by engaging the engaging piece with the engaging hole.

The engaging piece is surrounded, at three sides, by a groove having a U-shape, and is connected to the second attaching portion by a connecting portion disposed on the main body-side. Thus, when the fuel nozzle holder is attached to the retainer, the engaging piece can be easily deflected with respect to the connecting portion connected to the second attaching portion, so that the engaging piece can be engaged with the engaging hole.

The holding portion extends toward the longitudinal center of the filler pipe such that the groove is covered with the holding portion. Thus, when the fuel nozzle holder is attached to the retainer, the groove portions of the groove that are parallel to the longitudinal direction of the fuel nozzle holder can be covered by the holding portion of the retainer. As a result, the fuel oil and the gas containing fuel vapor can be prevented from leaking out from the inlet of the filler pipe via the groove.

The fuel nozzle holder is fixed to the retainer by engaging the engaging piece with the engaging hole. Thus, the fuel nozzle holder can be disposed at a prescribed position in the retainer by inserting the fuel nozzle holder into the retainer, and the fuel nozzle holder can be removed from the retainer for repairs or the like.

Because the holding portion extends toward the longitudinal center of the filler pipe such that the groove is covered with the holding portion, the groove portions of the groove that are parallel to the longitudinal direction of the fuel nozzle holder can be covered by the holding portion of the retainer. As a result, the fuel oil and the gas containing fuel vapor can be prevented from leaking out from the inlet of the filler pipe via the groove. The fuel nozzle holder is fixed to the retainer by engaging the engaging piece with the engaging hole. Thus, the fuel nozzle holder can be disposed at a prescribed position in the retainer by inserting the fuel nozzle holder into the retainer, and the fuel nozzle holder can be removed from the retainer for repairs or the like.

In the first aspect, the engaging hole may be provided in each of two locations in the retainer; and the engaging piece may be provided in each of two locations on the fuel nozzle holder, each of the engaging pieces being configured to be engaged with a corresponding one of the engaging holes.

In the configuration described above, the engaging hole is provided in each of two locations in the retainer, and the engaging piece is provided in each of two locations on the fuel nozzle holder. Each of the engaging pieces is configured to be engaged with a corresponding one of the engaging holes. Thus, the fuel nozzle holder is engaged, in two locations, with the retainer, and can be stably held.

In the first aspect, a length of the engaging hole in a circumferential direction of the retainer may be longer than a width of the engaging hole in a longitudinal direction of the retainer; and a length of the engaging piece in a circumferential direction of the fuel nozzle holder may be longer than a width of the engaging piece in the longitudinal direction of the fuel nozzle holder.

In the configuration described above, the length of the engaging hole in the circumferential direction of the retainer is longer than the width of the engaging hole in the longitudinal direction of the retainer, and the length of the engaging piece in the circumferential direction of the fuel nozzle holder is longer than the width of the engaging piece in the longitudinal direction of the fuel nozzle holder. Thus, the engaging piece is firmly engaged with the engaging hole over a long length in the circumferential direction, so that the fuel nozzle holder is stably attached to the retainer.

In the first aspect, the engaging piece may include a protrusion extending in a circumferential direction of the second attaching portion, the protrusion protruding radially outward from the second attaching portion.

In the configuration described above, the engaging piece includes a protrusion extending in the circumferential direction of the second attaching portion, and the protrusion protrudes radially outward from the second attaching portion. Thus, the protrusion is reliably engaged with the engaging hole, so that the engaging piece can be firmly engaged with the engaging hole.

In the first aspect, the retainer and the fuel nozzle holder may be made of synthetic resin or metal.

In the configuration described above, the retainer and the fuel nozzle holder are made of synthetic resin or metal. When the retainer and the fuel nozzle holder are made of synthetic resin, it is easy to manufacture the retainer and the fuel nozzle holder into prescribed shapes. When the retainer and the fuel nozzle holder are made of metal, the rigidity of the retainer and the fuel nozzle holder is high, so that the distal end portion of the fuel nozzle can be reliably held, and durability is also greater.

In the first aspect, an inner peripheral surface of the holding portion may be in contact with an outer peripheral surface of the second attaching portion.

In the first aspect, the fuel nozzle holder may include a distal end portion extending from the main body toward the longitudinal center of the filler pipe, the distal end portion being configured to hold a distal end portion of a fuel nozzle.

In the first aspect, when the engaging piece includes a protrusion extending in a circumferential direction of the second attaching portion, the protrusion protruding radially outward from the second attaching portion, the engaging piece may be engaged with the engaging hole when the protrusion enters the engaging hole.

In the first aspect, when the engaging piece includes a protrusion extending in a circumferential direction of the second attaching portion, the protrusion protruding radially outward from the second attaching portion, a part of the groove, which is closer to the main body than the protrusion is, may have a length shorter than a distance between the opening and the engaging hole.

The second aspect of the present disclosure provides a filler pipe to which a retainer that holds a fuel nozzle holder is attached. In the second aspect, the retainer includes: a first attaching portion attached to an inlet portion of the filler pipe; a holding portion having an engaging hole; and an opening positioned at a first end of the retainer, the first end being closer to a longitudinal center of the filler pipe than a second end of the retainer is, and the fuel nozzle holder includes: a second attaching portion having a circular cylindrical shape, the second attaching portion including an engaging piece; and a main body extending from the second attaching portion toward the longitudinal center of the filler pipe. The fuel nozzle holder is held by the retainer by engaging the engaging piece with the engaging hole, the engaging piece is connected to the second attaching portion by a connecting portion provided on a main body-side of the engaging piece, and the engaging piece is separated from the second attaching portion by a groove, at least at a side opposite from the main body-side and at both sides in a circumferential direction of the second attaching portion, and the holding portion extends toward the longitudinal center of the filler pipe such that the groove is covered with the holding portion.

In the second aspect, an inner peripheral surface of the holding portion may be in contact with an outer peripheral surface of the second attaching portion.

The third aspect of the present disclosure provides a vehicle fuel filler port structure including: a filler pipe; a retainer including a first attaching portion attached to an inlet portion of the filler pipe, a holding portion having an engaging hole, and an opening positioned at a first end of the retainer, the first end being closer to a longitudinal center of the filler pipe than a second end of the retainer is; and a fuel nozzle holder including a second attaching portion having a circular cylindrical shape, the second attaching portion including an engaging piece, and a main body extending from the second attaching portion toward the longitudinal center of the filler pipe. The fuel nozzle holder is held by the retainer by engaging the engaging piece with the engaging hole, the engaging piece is connected to the second attaching portion by a connecting portion provided on a main body-side of the engaging piece, and the engaging piece is separated from the second attaching portion by a groove, at least at a side opposite from the main body-side and at both sides in a circumferential direction of the second attaching portion, and the holding portion extends toward the longitudinal center of the filler pipe such that the groove is covered with the holding portion.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

In a present example embodiment, a retainer 20 and a fuel nozzle holder 30 are attached to a filler pipe 10 configured to supply fuel into a vehicle fuel tank from a vehicle body fuel filler port provided in a vehicle body of a vehicle. The filler pipe 10 may be made of synthetic resin or metal. The retainer 20 is attached to an inlet portion 12 of the filler pipe 10.

Figure 4:
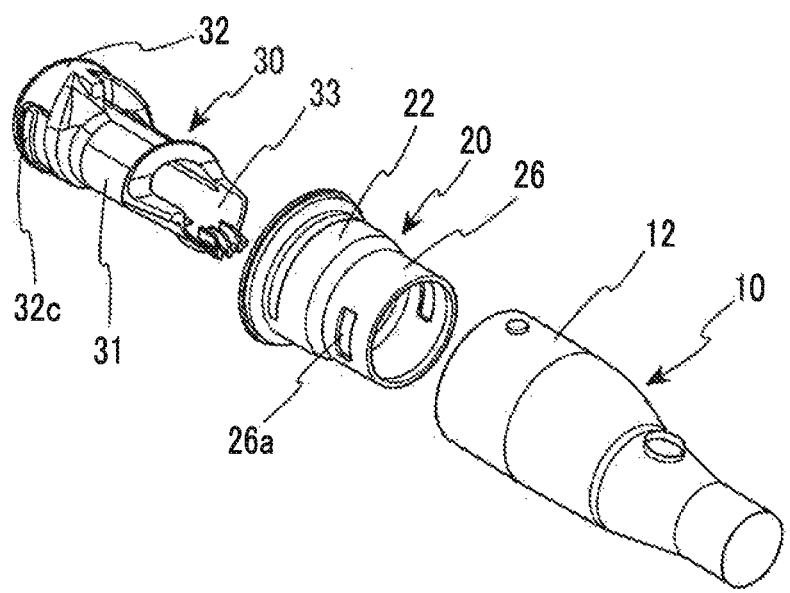
FIG. 4 is an exploded perspective view illustrating a state where the retainer and the fuel nozzle holder are being assembled to a filler pipe, according to the example embodiment of the present disclosure.
Figure 5:
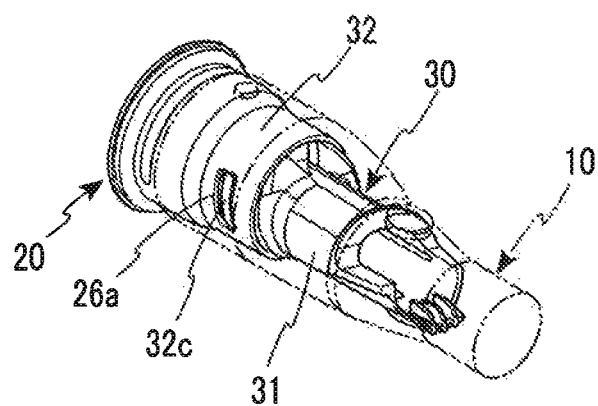
FIG. 5 is a perspective view illustrating a state where the fuel nozzle holder is attached to the retainer and the filler pipe as viewed from a position obliquely upward of these members, according to the example embodiment of the present disclosure.
Figure 6:
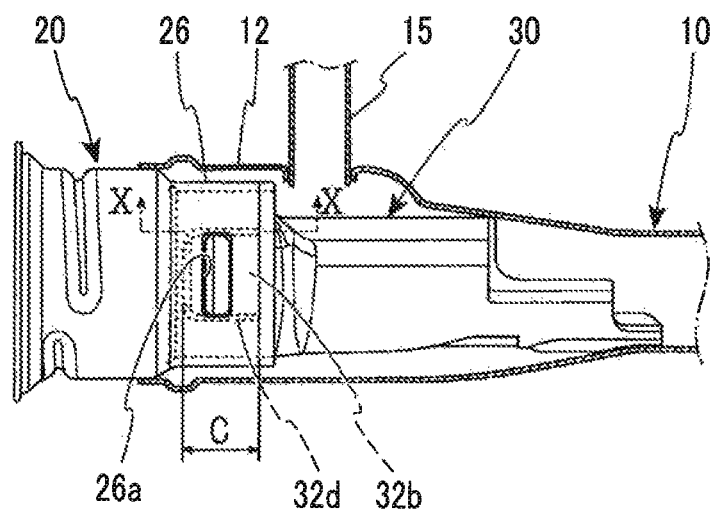
FIG. 6 is a sectional view illustrating the state where the fuel nozzle holder is attached to the retainer and the filler pipe, according to the example embodiment of the present disclosure.

As illustrated in FIGS. 4 to 6, the inlet portion 12 is provided at one end portion of the filler pipe 10. The retainer 20 is attached to the inlet portion 12. A main body of the filler pipe 10 extends from the inlet portion 12 and is connected to the fuel tank. A distal end of a breather pipe 15 is attached to a portion of the inlet portion 12 near the base thereof.

Figure 1:
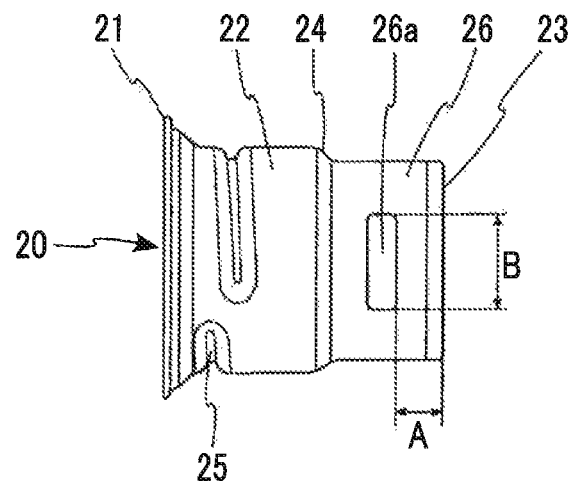
FIG. 1 is a side view of a retainer according to one example embodiment of the present disclosure.

Next, the retainer 20 will be described with reference to FIG. 1. The fuel nozzle holder 30 is attached to a first attaching portion 22 of the retainer 20. The fuel nozzle holder 30 will be described later. A filler edge 21 having an opening is provided at one end of the retainer 20, as illustrated in FIG. 1. The opening of the filler edge 21 is disposed at a vehicle body filler port into which a fuel nozzle 40 is inserted.

The first attaching portion 22 is integral with the filler edge 21, and has a circular cylindrical shape extending from the filler edge 21. When the retainer 20 is inserted into the inlet portion 12 of the filler pipe 10, an outer surface of the first attaching portion 22 comes into contact with and becomes fixed to an inner surface of the inlet portion 12 of the filler pipe 10, so that the retainer 20 is stably held.

The first attaching portion 22 may have a helicoidal retainer thread portion 25 protruding radially inward. When the filler edge 21 is covered with a tank cap (not illustrated), the tank cap can be attached to the first attaching portion 22 by fitting a thread portion provided on an outer periphery of the tank cap into the retainer thread portion 25 of the first attaching portion 22. When a unit with a flap, instead of a tank cap, is attached to the retainer 20, the insertion amount of the fuel nozzle 40 or the fuel flow direction can be made constant by disposing the retainer 20 at the end of the unit with a flap.

An attaching tilted surface 24 is provided so as to be continuous with the first attaching portion 22. The attaching tilted surface 24 is provided so as to continuously connect the first attaching portion 22 and a holding portion 26 to each other. With this configuration, the fuel nozzle holder 30 can be more easily inserted into the retainer 20. Further, the fuel nozzle 40 can be more smoothly inserted into the fuel nozzle holder 30 from the retainer 20.

The holding portion 26 having a circular cylindrical shape is provided so as to be continuous with the attaching tilted surface 24. The holding portion 26 has an engaging hole 26a. An engaging piece 32b (described later) is engaged with the engaging hole 26a. The engaging hole 26a is preferably provided in two locations on the opposite sides of the holding portion 26. The engaging holes 26a in the two locations are preferably 180 degrees apart from each other. In this case, the fuel nozzle holder 30 can be stably held by being engaged, at two locations, with the retainer 20.

The engaging hole 26a has an oblong shape that is longer in the circumferential direction of the retainer 20 than in the longitudinal direction of the retainer 20. Thus, an engaging portion is longer, so that the engaging piece 32b can be firmly engaged with the engaging hole 26a. As a result, the fuel nozzle holder 30 can be stably attached to the retainer 20. The length (indicated by a reference character B in FIG. 1) of the engaging hole 26a in the circumferential direction is equal to or slightly longer than the length of the engaging piece 32b (described later).

A distal end of the holding portion 26 has an opening 23 that is smaller in diameter than the first attaching portion 22. The distance (indicated by a reference character A in FIG. 1) between the opening 23 and a side end of the engaging hole 26a on the opening 23-side is approximately 3 mm to 10 mm.

Figure 8:
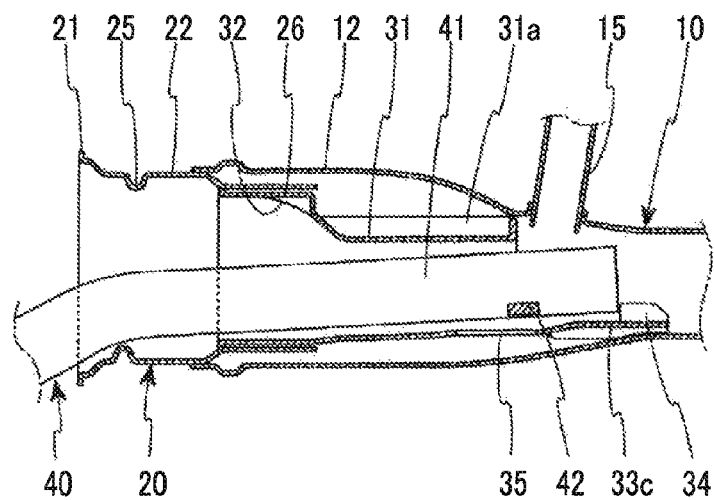
FIG. 8 is a sectional view illustrating a state where the fuel nozzle holder is assembled to the retainer and the filler pipe and a fuel nozzle is inserted in these members, according to the example embodiment of the present disclosure.
Figure 9:
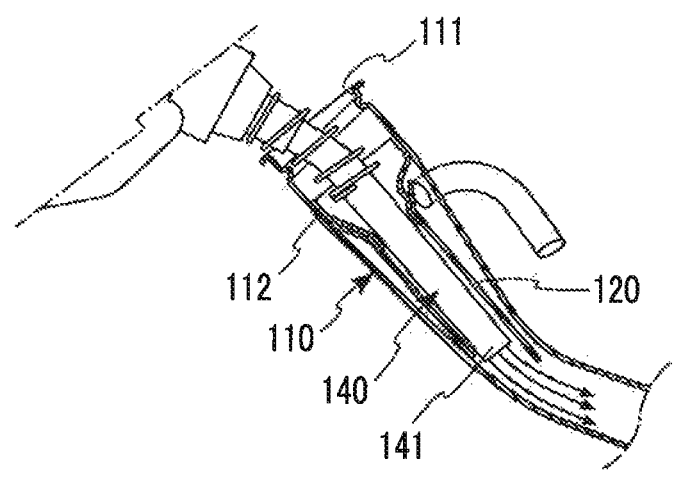
FIG. 9 is a sectional view of a region where a retainer is attached to an inlet portion of a filler pipe according to related art.
Figure 10:
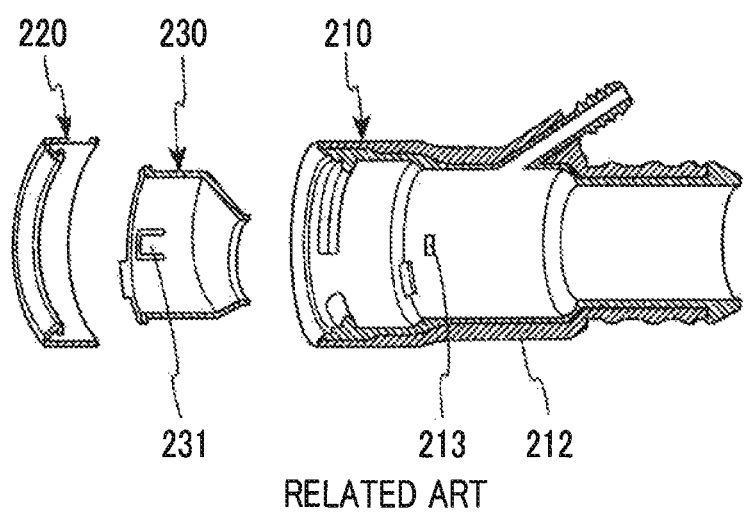
FIG. 10 is an exploded sectional view of a region where a retainer is attached to an inlet portion of a filler pipe according to related art.
Figure 11:
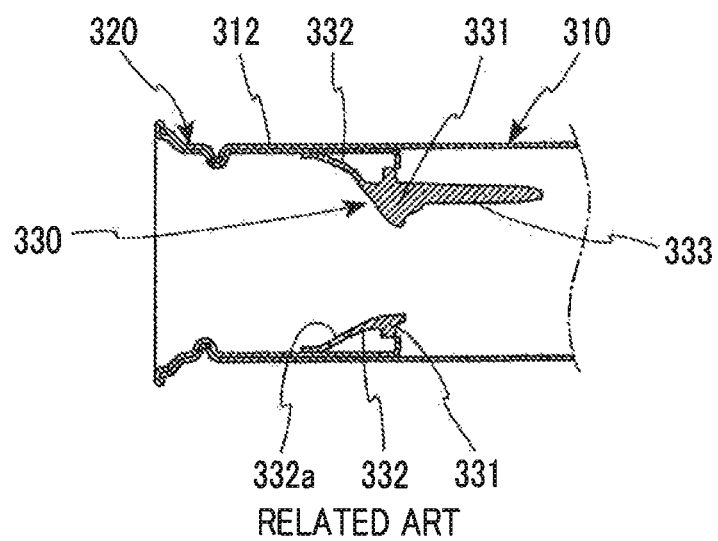
FIG. 11 is a sectional view of a region where a retainer and a fuel nozzle holder are attached to an inlet portion of a filler pipe according to related art.
Figure 12:
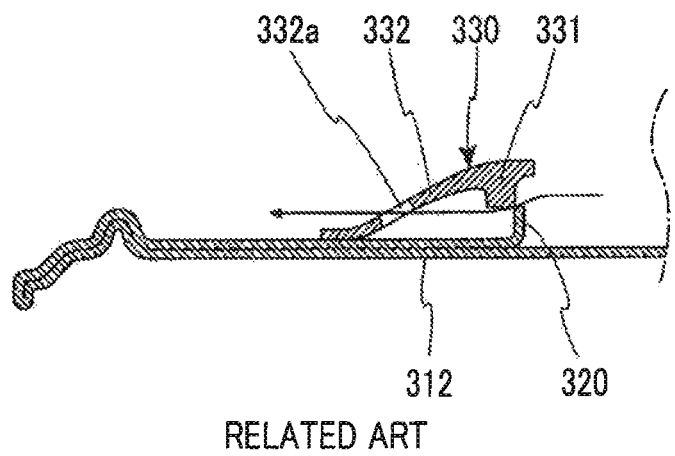
FIG. 12 is an enlarged sectional view of a groove portion in a state where the fuel nozzle holder is assembled to the retainer and the filler pipe according to the related art.

As illustrated in FIG. 8, when the fuel nozzle holder 30 is inserted into the retainer 20 from the filler edge 21, a main body 31 (described later) of the fuel nozzle holder 30 protrudes out from the opening 23 in the extending direction of the filler pipe 10. A distal end portion 41 of the fuel nozzle 40 can be held by a distal end portion 33 (described later) of the fuel nozzle holder 30, so that the direction in which the fuel is squirted can be maintained at a prescribed direction.

The fuel nozzle holder 30 is attached to the holding portion 26, as illustrated in FIGS. 4 to 6. The shape of the fuel nozzle holder 30 will be described with reference to FIGS. 2 to 4. The fuel nozzle holder 30 includes a second attaching portion 32 configured to be attached to the retainer 20, the main body 31 provided so as to be continuous from the second attaching portion 32 and serving as a main body of the fuel nozzle holder 30, and the distal end portion 33 provided at a distal portion of the main body 31.

The retainer 20 and the fuel nozzle holder 30 are preferably made of synthetic resin or metal. When the retainer 20 and the fuel nozzle holder 30 are made of synthetic resin, it is easy to manufacture the retainer 20 and the fuel nozzle holder 30 in prescribed shapes. When the retainer 20 and the fuel nozzle holder 30 are made of metal, the rigidity of the retainer 20 and the fuel nozzle holder 30 is high so that the retainer 20 can be firmly attached to the filler pipe 10, the fuel nozzle holder 30 can securely hold the distal end portion of the fuel nozzle 40, and the durability is high. Alternatively, the retainer 20 may be made of metal, whereas the fuel nozzle holder 30 may be made of synthetic resin.

The second attaching portion 32 of the fuel nozzle holder 30 is inserted into the holding portion 26 of the retainer 20, and fixed to the inner surface of the holding portion 26. Because the second attaching portion 32 of the fuel nozzle holder 30 is tightly attached to the inner surface of the holding portion 26, the distal end portion 41 of the fuel nozzle 40 that enters the fuel nozzle holder 30 from the holding portion 26 can be securely held.

Figure 2:
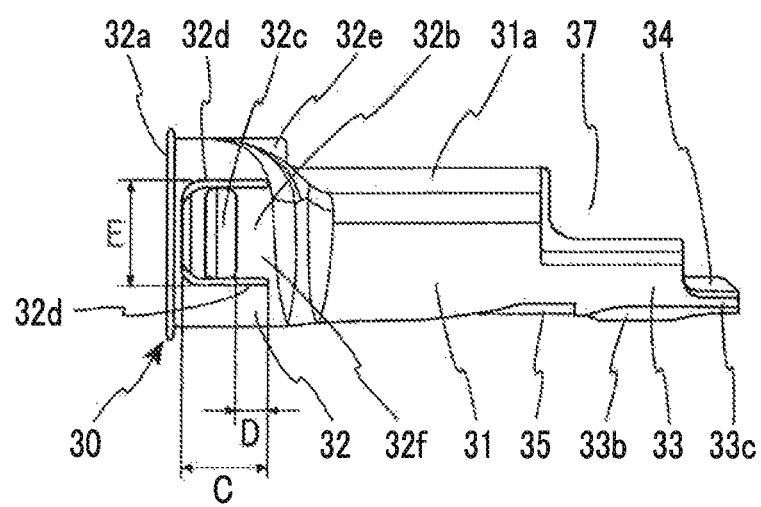
FIG. 2 is a side view of a fuel nozzle holder according to the example embodiment of the present disclosure.

The engaging pieces 32b are provided on the opposite sides of the second attaching portion 32, as illustrated in FIG. 2. Each engaging piece 32b has a protrusion 32c. The fuel nozzle holder 30 is fixed to the retainer 20 by engaging the engaging pieces 32b with the engaging holes 26a. Thus, the fuel nozzle holder 30 can be attached to the retainer 20 by inserting the fuel nozzle holder 30 into the retainer 20, and the fuel nozzle holder 30 can also be removed from the retainer 20 for repairs or the like.

The engaging piece 32b is surrounded, at three sides, by the groove 32d having a U-shape. The groove 32d is formed by cutting out part of a wall surface of the second attaching portion 32 of the fuel nozzle holder 30. Two sides out of the three sides are parallel to the longitudinal direction of the fuel nozzle holder 30. The ends of the two sides on a seal ridge 32a-side are connected together by the remaining one side formed in the circumferential direction of the fuel nozzle holder 30, whereby the groove 32d has a U-shape. The length of the groove 32d in the longitudinal direction of the fuel nozzle holder 30 is indicated by a reference character C in FIG. 2, and the length of the groove 32d in the circumferential direction of the fuel nozzle holder 30 is indicated by a reference character E in FIG. 2.

The engaging piece 32b is integrally connected to the second attaching portion 32 by a connecting portion 32f that is on the opposite side from the side where the groove 32d is provided. Thus, the engaging piece 32b can be easily deflected, at a portion indicated by the reference character C at the groove 32d, with respect to the connecting portion 32f connected to the second attaching portion 32, so that the engaging piece 32b can be engaged with the engaging hole 26a.

At this time, the length (indicated by the reference character B in FIG. 1) of the engaging hole 26a in the circumferential direction is slightly longer than the length of the engaging piece 32b in the circumferential direction, and is substantially equal to the length (indicated by the reference character E in FIG. 2) of the groove 32d in the circumferential direction. When the engaging piece 32b is engaged with the engaging hole 26a, the distal end of the engaging piece 32b can reach a position near the attaching tilted surface 24 of the holding portion 26 of the retainer 20, as illustrated in FIG. 6.

The groove 32d has groove portions that are parallel to the longitudinal direction of the fuel nozzle holder 30. A part of each the groove portion, which is closer to the main body 31 than the protrusion 32c is, has a length (indicated by a reference character D in FIG. 2) shorter than the distance (indicated by the reference character A in FIG. 1) between the opening 23 and the engaging hole 26a of the retainer 20. The length indicated by the reference character D in FIG. 2 is approximately 2 mm to 9 mm. As described above, the distance indicated by the reference character A in FIG. 1 is approximately 3 mm to 10 mm, so that the length indicated by the reference character A is approximately 1 mm longer than the length indicated by reference character D. That is, the holding portion 26 of the retainer 20 extends to a position that is deeper in the fuel nozzle insertion direction than a position to which the groove 32d extends.

Thus, the base portions of the groove portions of the groove 32d, which are parallel to the longitudinal direction of the fuel nozzle holder 30, can be covered by the holding portion 26 of the retainer 20. Further, a portion of the groove 32d, which extends in the circumferential direction, can be covered by a portion of the holding portion 26, which is closer to the first attaching portion 22 than the engaging hole 26a is. Thus, the fuel or the gas containing fuel vapor can be prevented from flowing out from the inlet of the filler pipe 10 through the groove 32d.

The engaging piece 32b has the protrusion 32c that extends in the circumferential direction and that protrudes radially outward. With this configuration, the engaging piece 32b can be firmly engaged with the engaging hole 26a by securely engaging the protrusion 32c with the engaging hole 26a.

The second attaching portion 32 has a circular cylindrical shape, and has a seal ridge 32a on its an outer periphery. The seal ridge 32a is provided on an end of the second attaching portion 32, the end being on the vehicle body fuel filler port side, that is, the end being on the retainer 20's inlet side. The seal ridge 32a can provide sealing by coming into contact with the inner surface of the retainer 20.

Next, the main body 31 of the fuel nozzle holder 30 will be described. The main body 31 has a circular cylindrical shape having a diameter smaller than the diameter of the second attaching portion 32. The main body 31 and the second attaching portion 32 are integrally and continuously connected to each other by a tilted surface. A rib 32e is provided on an outer side of the tilted surface. A main body rib 31a is provided on an upper portion of the main body 31. With this configuration, the fuel nozzle holder 30 can be stably attached to the retainer 20, as illustrated in FIG. 6.

A holding portion upper open portion 37 that is open is provided in a distal end-side upper surface of the main body 31 of the fuel nozzle holder 30. Because the holding portion upper open portion 37 is provided, the upper surface of the fuel nozzle holder 30 is open. As illustrated in FIG. 8, while a fuel nozzle engaging piece 34 (described later) is engaged with the distal end portion 41 of the fuel nozzle 40, the distal end portion 41 of the fuel nozzle 40 can be prevented from getting stuck in the fuel nozzle holder 30. In addition, the fuel nozzle 40 can be easily inserted into the retainer 20 and removed from the retainer 20.

A distal end portion 33 is provided at the distal end of the main body 31. The distal end portion 33 includes a holding piece 33c and the fuel nozzle engaging piece 34. The holding piece 33c holds the lower surface of the distal end portion 41 of the fuel nozzle 40. The fuel nozzle engaging piece 34 is provided on the holding piece 33c, and is engaged with the distal end portion 41 of the fuel nozzle 40. The distal end portion 33 is inserted into the filler pipe 10 to a position close to the main body of the filler pipe 10, as illustrated in FIG. 6 and FIG. 8. A distal end portion outside rib 33b is provided on an outer side of the distal end portion 33, and can come into contact with the inner surface of the filler pipe 10.

The holding piece 33c is provided on the lower side of the distal end portion 33. The holding piece 33c holds the distal end portion 41 of the fuel nozzle 40 and the distal end portion 41 of the fuel nozzle 40 is engaged with the fuel nozzle engaging piece 34, so that the distal end portion 41 of the fuel nozzle 40 is prevented from entering deep into the filler pipe 10 (in a direction toward the fuel tank) beyond the fuel nozzle engaging piece 34. In this way, the distal end portion 41 of the fuel nozzle 40 can be stopped at a prescribed position. Thus, the distal end portion 41 of the fuel nozzle 40 is stably positioned, so that the fuel can be supplied from the fuel nozzle 40 into the filler pipe 10 with the flow of fuel maintained stable.

An auto-stop sensor hole 35 is provided at a position in the distal end portion 33 of the fuel nozzle holder 30. This position where the auto-stop sensor hole 35 is provided corresponds to a position of an auto-stop sensor 42 fitted to the distal end portion 41 of the fuel nozzle 40. Thus, when the fuel tank becomes full during fueling from the fuel nozzle 40, the auto-stop sensor 42 reliably detects the fuel through the auto-stop sensor hole 35, and the auto-stop sensor 42 is activated. This makes it possible to prevent erroneous detection.

Figure 3:
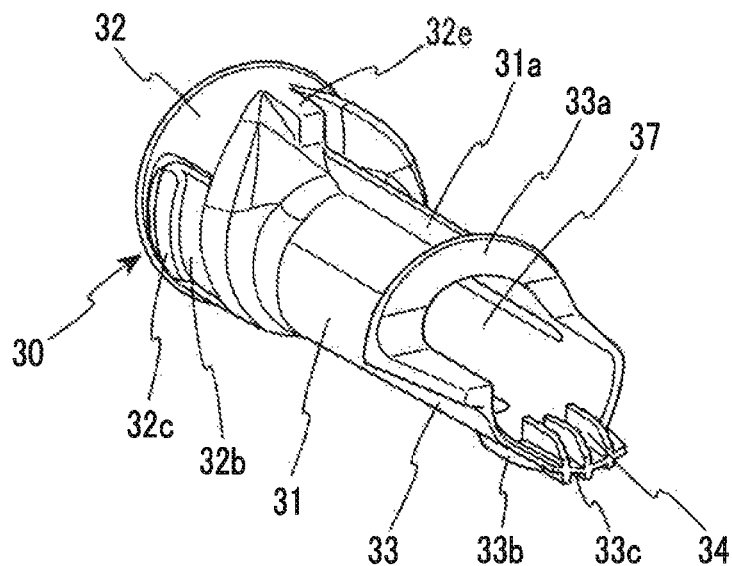
FIG. 3 is a perspective view of the fuel nozzle holder as viewed from a position obliquely upward of the fuel nozzle holder, according to the example embodiment of the present disclosure.

Next, the operation of inserting the distal end portion 41 of the fuel nozzle 40 from the filler edge 21 of the retainer 20 will be described. When the distal end portion 41 of the fuel nozzle 40 is inserted from the filler edge 21 of the retainer 20, as illustrated in FIG. 1 and FIG. 3, the distal end portion 41 passes through the first attaching portion 22 of the retainer 20, then passes through the second attaching portion 32 and the main body 31 of the fuel nozzle holder 30, and then reaches the distal end portion 33 of the fuel nozzle holder 30.

Figure 7:
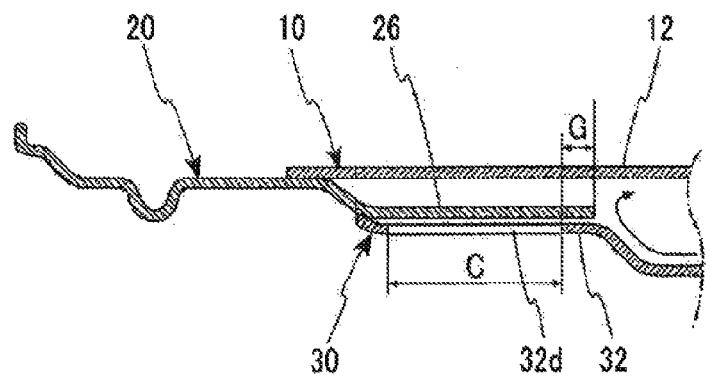
FIG. 7 is an enlarged sectional view of a groove portion in a state where the fuel nozzle holder is assembled to the retainer and the filler pipe, according to the example embodiment of the present disclosure.

Then, when the fuel is supplied from the distal end portion 41 of the fuel nozzle 40, the fuel flows through the filler pipe 10 and flows into the fuel tank (not illustrated). At this time, the fuel or the gas containing the fuel vapor flows back toward the retainer 20 from the filler pipe 10. This flow is indicated by the arrow in FIG. 7.

The fuel or the gas containing the fuel vapor reaches the distal end of the holding portion 26 and a portion of the groove 32d. However, because the holding portion 26 covers a portion of the groove 32d indicated by the reference character C in FIG. 7 and overlaps with the second attaching portion 32 by an amount indicated by a reference character G in FIG. 7, the fuel or the gas containing the fuel vapor do not leak out from the groove 32d. That is, as illustrated in FIG. 1 and FIG. 2, the A-dimension portion of the holding portion 26 of the retainer 20 covers the D-dimension portion of the groove 32d of the fuel nozzle holder 30, and the holding portion 26 can cover the other portions of the groove 32d.

Further, with the fuel nozzle engaging piece 34, the distal end portion 41 of the fuel nozzle 40 is prevented from entering excessively deep into the filler pipe 10, so that the fuel nozzle 40 can be easily inserted into the retainer 20 and removed from the retainer 20. Moreover, the upper surface of the fuel nozzle holder 30 is open as the holding portion upper open portion 37, so that the distal end portion 41 of the fuel nozzle 40 do not become stuck in the fuel nozzle holder 30.

While one example embodiment of the present disclosure has been described, modifications such as those described below are also possible. For example, in the example embodiment described above, the groove 32d has a U-shape. However, as long as the engaging piece 32b can deflected with respect to the connecting portion 32f that is connected to the second attaching portion 32, the shape of the groove 32d is not limited to a U-shape. For example, the groove 32d may have a V-shape or a semicircular shape.

What is claimed is:
1. A filler pipe to which a retainer that holds a fuel nozzle holder is attached, wherein
the retainer includes:
a first attaching portion attached to an inlet portion of the filler pipe;
a holding portion having an engaging hole; and
an opening positioned at a first end of the retainer, the first end being closer to a longitudinal center of the filler pipe than a second end of the retainer is, and
the fuel nozzle holder includes:

a second attaching portion having a circular cylindrical shape, the second attaching portion including an engaging piece; and a main body extending from the second attaching portion toward the longitudinal center of the filler pipe, wherein the engaging piece is surrounded at three sides by a groove having a U-shape, the engaging piece being connected to the second attaching portion by a connecting portion provided on a main body-side of the engaging piece, and the holding portion extends toward the longitudinal center of the filler pipe such that the groove is covered with the holding portion, and the fuel nozzle holder is held by the retainer by engaging the engaging piece with the engaging hole.

2. The filler pipe according to claim 1, wherein:

the engaging hole is provided in each of two locations in the retainer; and the engaging piece is provided in each of two locations on the fuel nozzle holder, each of the engaging pieces being configured to be engaged with a corresponding one of the engaging holes.

3. The filler pipe according to claim 1, wherein:

a length of the engaging hole in a circumferential direction of the retainer is longer than a width of the engaging hole in a longitudinal direction of the retainer; and a length of the engaging piece in a circumferential direction of the fuel nozzle holder is longer than a width of the engaging piece in the longitudinal direction of the fuel nozzle holder.

4. The filler pipe according to claim 1, wherein the engaging piece includes a protrusion extending in a circumferential direction of the second attaching portion, the protrusion protruding radially outward from the second attaching portion.

5. The filler pipe according to claim 1, wherein the retainer and the fuel nozzle holder are made of synthetic resin or metal.

6. The filler pipe according to claim 1, wherein an inner peripheral surface of the holding portion is in contact with an outer peripheral surface of the second attaching portion.

7. The filler pipe according to claim 1, wherein the fuel nozzle holder includes a distal end portion extending from the main body toward the longitudinal center of the filler pipe, the distal end portion being configured to hold a distal end portion of a fuel nozzle.

8. The filler pipe according to claim 4, wherein the engaging piece is engaged with the engaging hole when the protrusion enters the engaging hole.

9. The filler pipe according to claim 4, wherein a part of the groove, which is closer to the main body than the protrusion is, has a length shorter than a distance between the opening and the engaging hole.

10. A filler pipe to which a retainer that holds a fuel nozzle holder is attached, wherein the retainer includes:

a first attaching portion attached to an inlet portion of the filler pipe;

a holding portion having an engaging hole; and an opening positioned at a first end of the retainer, the first end being closer to a longitudinal center of the filler pipe than a second end of the retainer is, and the fuel nozzle holder includes:

a second attaching portion having a circular cylindrical shape, the second attaching portion including an engaging piece; and a main body extending from the second attaching portion toward the longitudinal center of the filler pipe, wherein the fuel nozzle holder is held by the retainer by engaging the engaging piece with the engaging hole, the engaging piece is connected to the second attaching portion by a connecting portion provided on a main body-side of the engaging piece, and the engaging piece is separated from the second attaching portion by a groove, at least at a side opposite from the main body-side and at both sides in a circumferential direction of the second attaching portion, and the holding portion extends toward the longitudinal center of the filler pipe such that the groove is covered with the holding portion.

11. The filler pipe according to claim 10, wherein an inner peripheral surface of the holding portion is in contact with an outer peripheral surface of the second attaching portion.

12. A vehicle fuel filler port structure comprising:

a filler pipe;

a retainer including a first attaching portion attached to an inlet portion of the filler pipe, a holding portion having an engaging hole, and an opening positioned at a first end of the retainer, the first end being closer to a longitudinal center of the filler pipe than a second end of the retainer is; and a fuel nozzle holder including a second attaching portion having a circular cylindrical shape, the second attaching portion including an engaging piece, and a main body extending from the second attaching portion toward the longitudinal center of the filler pipe, wherein the fuel nozzle holder is held by the retainer by engaging the engaging piece with the engaging hole, the engaging piece is connected to the second attaching portion by a connecting portion provided on a main body-side of the engaging piece, and the engaging piece is separated from the second attaching portion by a groove, at least at a side opposite from the main body-side and at both sides in a circumferential direction of the second attaching portion, and the holding portion extends toward the longitudinal center of the filler pipe such that the groove is covered with the holding portion.

* * * * *